United States Patent [19]

Katsuta et al.

[11] Patent Number: 4,741,953
[45] Date of Patent: May 3, 1988

[54] MAGNETIC RECORDING MEDIUM

[75] Inventors: Yoshiharu Katsuta, Takatsuki; Haruo Ando, Suita, both of Japan

[73] Assignee: Hitachi Maxell, Ltd., Osaka, Japan

[21] Appl. No.: 841,785

[22] Filed: Mar. 20, 1986

[30] Foreign Application Priority Data

Mar. 20, 1985 [JP] Japan .................................. 60-56438

[51] Int. Cl.$^4$ ............................................... G11B 7/16
[52] U.S. Cl. .................................... 428/323; 427/131; 428/329; 428/694; 428/900
[58] Field of Search ............... 428/323, 329, 694, 900; 427/128, 131

[56] References Cited

U.S. PATENT DOCUMENTS

| | | | |
|---|---|---|---|
| 4,075,384 | 2/1978 | Suzuki et al. | 428/900 |
| 4,091,158 | 5/1978 | Kasuga et al. | 427/131 |
| 4,259,392 | 3/1981 | Suzuki | 428/694 |
| 4,265,931 | 5/1981 | Tamai et al. | 427/131 |

Primary Examiner—Paul J. Thibodeau
Attorney, Agent, or Firm—Birch, Stewart, Kolasch & Birch

[57] ABSTRACT

A magnetic recording medium having a broad dynamic range over an entire range of frequency which comprises a substrate material and a magnetic layer comprising magnetic particles and a resinous binder provided on at least one of the surfaces of the substrate material, characterized in that the magnetic layer is constructed as a double layered structure comprising an upper layer and a lower layer and which satisfies the following requirements:

$$H_1 > H_2 \quad (1)$$

$$r_1 < r_2 \quad (2)$$

wherein $H_1$ is the coercive force of the upper layer, $H_2$ is the coercive force of the lower layer, $r_1$ is the average size of the long axis of magnetic particles in the upper layer and $r_2$ is the average size of the long axis of magnetic particles in the lower layer, and the lower layer comprises as the magnetic particles iron oxide magnetic particles having a particle void content of not more than 5% by volume in average.

11 Claims, 1 Drawing Sheet

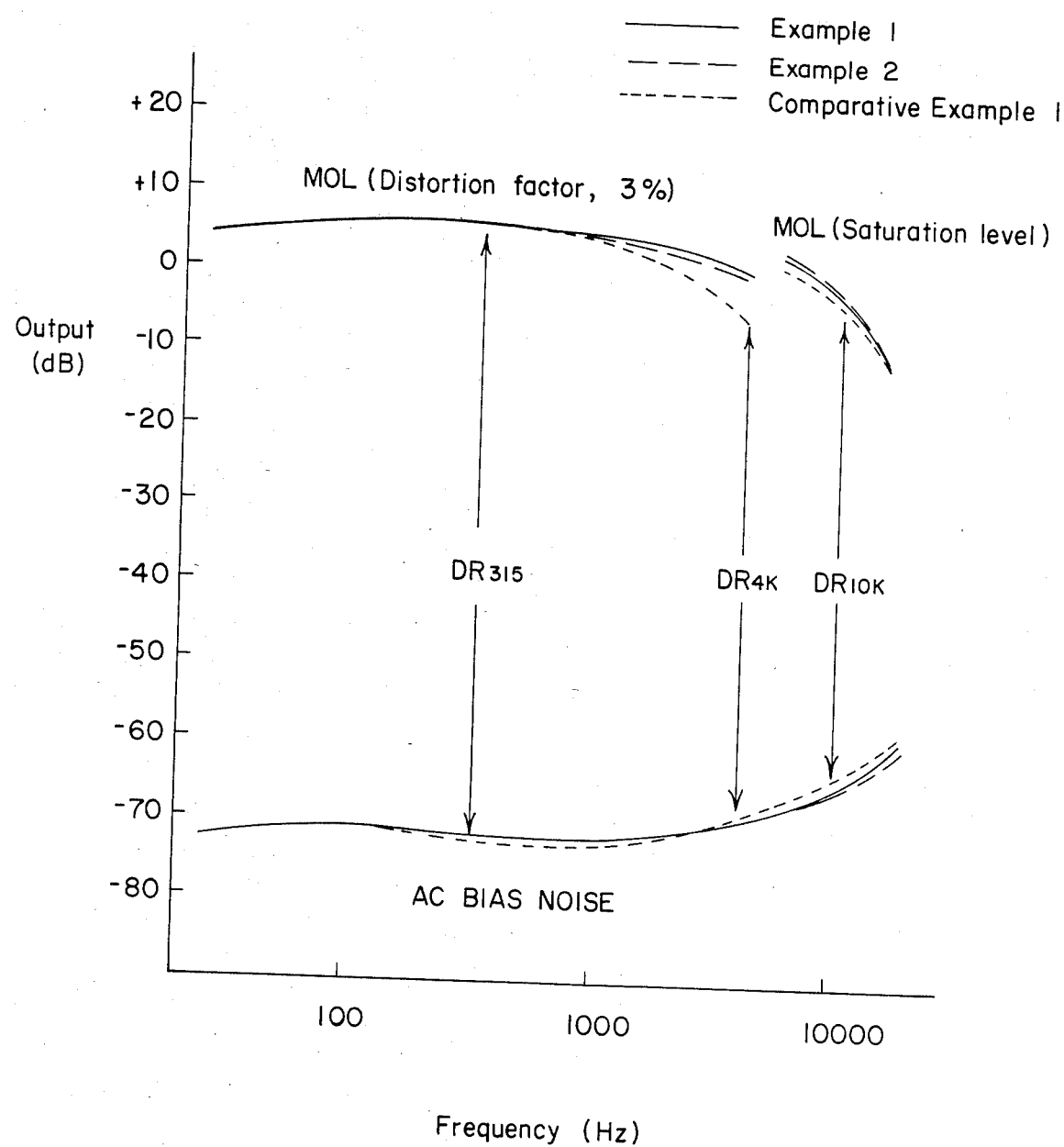

MAGNETIC RECORDING MEDIUM

BACKGROUND OF THE INVENTION

The present invention relates to a magnetic recording medium. More particularly, it relates to a magnetic recording medium comprising a magnetic layer constructed in a double layered structure and having high performance due to its broad dynamic range over an entire range of frequency.

In the present specification, the term "dynamic range" (hereinafter referred to as "DR") is intended to mean the difference between the maximum output level (MOL) and the noise level (AC bias noise) at a certain frequency.

DISCUSSION OF BACKGROUND ART

In magnetic recording medium, particularly an audio cassette tape, it is desirable to have broad or large DR over an entire range of frequency from a low frequency area to a high frequency area for producing high performances. In order to make the DR broader, it has been proposed to minimize the particle size of the magnetic particles as the recording element so as to suppress the noise level. However, the minimization of the magnetic particles deteriorates the dispersibility and the packing property, and the output level is thus lowered. Accordingly, the broadening of the DR by minimization of the magnetic particles has a certain restriction. It has also been proposed to construct the magnetic layer in a double layered structure, i.e. comprising an upper layer and a lower layer, and make the coercive force of the upper layer higher than that of the lower layer and/or make the particle size of the magnetic particles in the upper layer smaller than that of the magnetic particles in the lower layer larger so as to increase the output level with decrease of the noise level. This proposal is actually effective in broadening DR at low and high frequency areas. However, the magnetic layer in a double layered structure is different in bias characteristic between the upper layer and the lower layer so that the output level in a medium or intermediate frequency area is obliged to be lower. Thus, the broadening of DR in an entire range covering not only the low and high frequency areas but also the medium or intermedite frequency area can not be attained.

SUMMARY OF THE INVENTION

A main object of this invention is to provide a magnetic recording medium having broad or large DR in an entire range of frequency, i.e. from a low frequency area to a high frequency area without decrease of the output level in a medium or intermediate area.

As a result of extensive study, it has now been found that in a magnetic layer constructed as a double layered structure comprising an upper layer and a lower layer, the incorporation of magnetic particles having a small particle void content in at least one of the upper and lower layers can present a decrease of the output level in the medium or intermediate frequency area and assure the broadening of DR in the entire range of frequency. This invention is based on the above finding.

According to the present invention, there is provided a magnetic recording medium which comprises a substrate material and a magnetic layer comprising magnetic particles and a resinous binder provided on at least one surface of the substrate material, characterized in that the magnetic layer is constructed as a double layered structure comprising an upper layer and a lower layer and satisfies the following requirements:

$$H_1 > H_2 \quad (1)$$

$$r_1 < r_2 \quad (2)$$

wherein $H_1$ is the coercive force of the upper layer, $H_2$ is the coercive force of the lower layer, $r_1$ is the average size of long axis of magnetic particles in the upper layer and $r_2$ is the average size of long axis of magnetic particles in the lower layer, and at least one of the upper and lower layers having comprised therein, magnetic particles such as iron oxide magnetic particles having a particle void content of not more than 5% by volume in the average.

BRIEF DESCRIPTION OF THE DRAWINGS

The FIGURE shows the relationship of the output (db) and frequency ($H_2$) for various magnetic media.

As stated above, the magnetic recording medium of the invention is characterized in that the magnetic layer provided on the substrate material is constructed as a double layered structure, the lower layer and the upper layer of the magnetic layer to satisfy the requirements (1) and (2) in coercive force and particle size and the magnetic particles in at least one of the upper and lower layers having a certain specific particle void content.

The requirement (1) is essential in order to obtain good results in enhancement of the output level at the low and high frequency areas. In general, $H_1/H_2$ is to be not less than about 1.1, preferably from about 1.1 to 1.4. The absolute value of $H_1$, i.e. the coercive force value of the upper layer, may be usually within a range of about 380 to 450 oersteds for the normal position and within a range of about 650 to 850 for the high position.

The requirement (2) is essential for attaining a good smoothness at the surface of the magnetic layer so as to make the noise level lower. Further, this requirement contributes to the enhancement of the output level, because the particle size of the magnetic particles in the lower layer can be made larger so that the dispersibility and the packing property are made better. In general, $r_2/r_1$ may be not less than about 1.2, preferably from about 1.4 to 3.0. The absolute value of $r_2$, i.e. the average size of long axis of the magnetic particles in the lower layer is normally from about 0.2 to 0.6 microns. In such a case, the specific surface area determined by the nitrogen adsorption method is usually from about 20 to 35 m$^2$/g.

As defined above, the magnetic particles to be included in at least one of the upper and lower layers should be magnetic particles of iron oxide having a particle void content of not more than 5% by volume in the average. When the magnetic particles of such low particle void content as above are used, the decrease of the output level at a medium or intermediate frequency area (i.e. about 1 to 5 KHz) as usually observed on the magnetic layer in a double layered structure is prevented, so that the broadening of DR over an entire range from a low frequency area (i.e. less than about 1 KHz) to a high frequency area (i.e. more than about 5 KHz and up to about 15 KHz) can be assured. The iron oxide magnetic particles of low particle void content may be included in either one or both of the upper and lower layers. Particularly when the inclusion is made in the lower layer, a better result for enhancement of the output level in a medium or intermediate frequency area can be obtained.

The iron oxide magnetic particles of low particle void content can be obtained, for instance, by using as the starting material alpha-$Fe_2O_3$ particles prepared by treatment of a precipitate of ferric hydroxide with water under heating in the presence of a crystallization regulator and subjecting such starting material to reduction and/or oxidation. A desired particle void content can be readily achieved by controlling the conditions such as temperature, time and composition in said preparation procedure. Detailed description on the preparation procedure are seen in Japanese Patent Publication (examined) Nos. 4694/80, 22416/80 and 17290/81, Japanese Patent Publication (unexamined) No. 92527/82 and U.S. Pat. No. 4,202,871. As described in these literatures, the crystallization regulator may be chosen from polycarboxylic acids, hydroxycarboxylic acids, aminocarboxylic acids, polyamines, organic phosphonic acids, thiocarboxylic acids, polyvalent carboxylic acids, beta-dicarboxyl compounds, aromatic sulfonic acids, their salts and esters, phosphates, etc.

Conventional magnetic particles of iron oxide, optionally containing cobalt, other metal oxides of metals (e.g. iron, cobalt, nickel) and their alloys have, in general, a relatively high void content, such as about 8 to 10% by volume. The use of the iron oxide magnetic particles having such a small particle void content as 5% or less in this invention is thus quite unexpected.

The magnetic recording medium of the invention may be prepared by per conventional procedures. For instance, a magnetic coating composition for formation of the lower layer comprising magnetic particles and a resinous binder in a liquid medium is applied onto a substrate material such as a polymeric film (e.g. polyethylene terephthalate, polyvinyl acetate) to make a magnetic layer as the lower layer, optionally followed by surface treatment such as calendering. Then, a magnetic coating composition for formation of the upper layer comprising magnetic particles and a resinous binder in a liquid medium is applied onto the lower layer to make a magnetic layer as the upper layer, optionally followed by surface treatment, such as calendering.

In the above procedure, the magnetic particles in the lower and upper layers are appropriately chosen so as to satisfy the requirements (1) and (2). Further, iron oxide magnetic particles having the small particle void content are used as the magnetic particles in at least one of the upper and lower layers, preferably in the lower layer. Provided that the above conditions are met, other magnetic particles such as magnetic metal oxide particles and magnetic metal particles conventionally employed for the normal position and the high position may be optionally employed. The particle size of these other magnetic particles may be usually from 0.03 to 1.0 micron, preferably from 0.1 to 0.5 micron.

As the resinous binder, there may be used any conventional one, of which examples are vinyl chloride/vinyl acetate copolymer, polyurethane, polyacetal, polyvinyl butyral, polyester, polyisocyanate, cellulose resin, etc. In addition to these resinous binders, any crosslinking agent may be optionally used. The proportion of the weight of the magnetic particles to the total weight of the magnetic particles and the resinous binder may be the same or different between the upper and lower layers, and in general, it may be from 6:10 to 9:10.

Examples of the liquid medium are ketones (e.g. cyclohexanone, methyl ethyl ketone, methyl isobutyl ketone), esters (e.g. ethyl acetate, butyl acetate), aromatic hydrocarbons (e.g. benzene, toluene, xylene), alcohols (e.g. isopropanol), acid amides (e.g. dimethylformamide), sulfoxides (e.g. dimethylsulfoxide), ethers (e.g. tetrahydrofuran, dioxane), etc. Water and an emulsifier may be also used as the liquid medium.

In addition to the above components, the magnetic coating composition may comprise optionally other additives as conventionally employed. Their examples are dispersing agents, lubricants, antistatic agents, polishing agents, etc.

As to the thickness of the upper or lower layer of the magnetic layer in a double-layered structure, no particular limitation is present, and it is generally preferred that the thickness of the lower layer is equal to or larger than that of the upper layer. When, for instance, the thickness of the upper layer is $m_1$ and the thickness of the lower layer is $m_2$, the $m_2/m_1$ ratio is desired to be not less than 1.0, particularly from 1.1 to 4.0. Normally, the thickness of the lower layer ($m_2$) is within a range of 1.0 to 3.0 microns, while the total thickness of the upper and lower layers ($m_1 + m_2$) is within a range of 3.5 to 7.0 microns.

As stated above, the magnetic recording medium of the invention has a double layered magnetic layer comprising an upper layer and a lower layer wherein the magnetic particles in the upper and lower layers have coercive forces and particle sizes in certain specific relationships and iron oxide magnetic particles having a particle void content of not more than 5% by volume in average are used as the magnetic particles in at least one of the upper and lower layers. As the result, there is obtained a magnetic recording medium of high performances having broad or large DR over an entire range of frequency from a low frequency area to a high frequency area.

PREFERRED EMBODIMENTS

Practical and presently preferred embodiments of the invention are illustratively shown in the following examples wherein part(s) and % are by weight unless otherwise indicated.

EXAMPLE 1

In this Example, there are used the following two kinds of magnetic particles:

Magnetic particles (A):

Particle void content in average, 0% by volume; coercive force, 338 oersteds; saturated magnetization, 73.1 emu/g; average size of long axis, 0.4 micron; specific surface area (measured by the nitrogen adsorption method), 24.3 $m^2$/g.

Magnetic particles (B):

Particle void content in average, 9% by volume; coercive force, 385 oersteds; saturated magnetization, 72.4 emu/g; average size of long axis, 0.26 micron; specific surface area (measured by the nitrogen adsorption method), 32.0 $m^2$/g.

The following materials were well mixed in a ball mill to prepare a magnetic coating composition for the lower layer of a double layered magnetic layer:

| Materials | Part(s) |
| --- | --- |
| Magnetic particles (A) | 100 |
| "VAGH" (hydroxyl group-containing | 10 |

-continued

| Materials | Part(s) |
| --- | --- |
| vinyl chloride/vinyl acetate copolymer; manufactured by Union Carbide Corp.) | |
| "Pandex T-5201" (polyurethane resin; manufactured by Dainippon Ink Co., Ltd.) | 10 |
| "Colonate L" (low molecular weight polyisocyanate compound; manufactured by Nippon Polyurethane Co., Ltd.) | 8 |
| Lauric acid | 2 |
| Lecithin | 2 |
| Cyclohexanone | 70 |
| Toluene | 70 |

The above magnetic coating composition was applied onto a surface of a polyester film (12 microns in thickness) to form a magnetic layer as the lower layer having a dry thickness of 2.5 microns and dried, followed by calendering.

The following materials were well mixed in a ball mill to prepare a magnetic coating composition for the upper layer of a double layered magnetic layer:

| Materials | Part(s) |
| --- | --- |
| Magnetic particles (B) | 100 |
| "VAGH" (hydroxyl group-containing vinyl chloride/vinyl acetate copolymer; manufactured by Union Carbide Corp.) | 15 |
| "Pandex T-5201" (polyurethane resin; manufactured by Dainippon Ink Co., Ltd.) | 8 |
| "Colonate L" (low molecular weight polyisocyanate compound; manufactured by Nippon Polyurethane Co., Ltd.) | 5 |
| Lauric acid | 1 |
| Lecithin | 1 |
| Cyclohexanone | 70 |
| Toluene | 70 |

The above magnetic coating composition was applied onto the lower layer to form a magnetic layer as the upper layer having a dry thickness of 2.5 microns and dried, followed by calendering. The resulting film was slit in a desired width to make a magnetic recording tape.

EXAMPLE 2

In the same manner as in Example 1 but using magnetic particles (C) having the following properties (100 parts) in place of magnetic particles (A), there was prepared a magnetic recording tape: particle void content in average, 3% by volume; coercive force, 342 oersteds; saturated magnetization, 72.7 emu/g; average size of long axis, 0.4 microns; specific surface area (measured by the nitrogen adsorption method), 24.0 m²/g.

COMPARATIVE EXAMPLE 1

In the same manner as in Example 1 but using magnetic particles (D) having the following properties (100 parts) in place of magnetic particles (A), there was prepared a magnetic recording tape: particle void content in average, 9% by volume; coercive force, 338 oersteds; saturated magnetization, 73.0 emu/g; average size of long axis, 0.4 micron; specific surface area (measured by the nitrogen adsorption method), 25.1 m²/g.

With respect to each of the magnetic recording tapes as prepared in Examples 1 and 2 and Comparative Example 1, the magnetic characteristics such as coercive force (Hc), residual magnetic flux density (Br) and square ratio (Br/Bm; Bm=saturated magnetic flux density) and the frequency characteristics such as $DR_{315}$ (the difference between the maximum output level with 3% distortion factor at 315 Hz and the noise level at 315 Hz), $DR_{4k}$ (the difference between the maximum output level with 3% distortion factor at 4 KHz and the noise level at 4 KHz) and $DR_{10k}$ (the difference between the maximum output level with 3% distortion factor at 10 KHz and the noise level at 10 KHz) were examined, and the results are shown in the following table:

| Magnetic characteristics | Example 1 | Example 2 | Comparative 1 |
| --- | --- | --- | --- |
| Hc (Oe) | 365 | 369 | 362 |
| Br/Bm | 0.84 | 0.84 | 0.83 |
| Br (G) | 1,670 | 1,640 | 1,660 |
| $DR_{315}$ (dB) | 77 | 76 | 77 |
| $DR_{4k}$ (dB) | 69 | 68 | 68 |
| $DR_{10k}$ (dB) | 62 | 63 | 60 |

Each of the magnetic recording tapes obtained in Examples 1 and 2 and Comparative Example 1 was subjected to measurement of the maximum output level and the noise level (AC bias noise) in the entire range of frequency, and the results are shown in FIG. 1 of the accompanying drawing wherein the solid line, the broken line and the dotted line indicate respectively the values with Example 1, Example 2 and Comparative Example 1. The width between said two levels is DR, and a broader width gives better performances.

From the above results, it is understood that the magnetic recording tape of the invention has broad DR in an entire range of frequency from a low frequency area to a high frequency area including a medium or intermediatey frequency area and is thus excellent in performances.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium which comprises a substrate material and a magnetic layer provided on at least one of the surfaces of said substrate material, said magnetic layer comprising a two layered structure including an upper layer and a lower layer of magnetic particles and a resinous binder, said magnetic layer satisfying the following requirements:

$$H_1 > H_2 \quad (1)$$

$$r_1 < r_2 \quad (2)$$

wherein $H_1$ is the coercive force of the upper layer, $H_2$ is the coercive force of the lower layer, $r_1$ is the average size of the long axis of the magnetic particles in the upper layer and $r_2$ is the average size of the long axis of the magnetic particles in the lower layer, and wherein only the lower layer comprises magnetic particles having a particle void content of not more than an average of 5% by volume, said magnetic particles comprising iron oxide.

2. The magnetic recording medium according to claim 1, wherein $H_1/H_2$ is not less than 1.1.

3. The magnetic recording medium according to claim 1, wherein $r_2/r_1$ is not less than 1.2.

4. The magnetic recording medium according to claim 1, wherein $H_1/H_2$ is from about 1.1 to 1.4

5. The magnetic recording medium according to claim 1, wherein $r_2/r_1$ is from about 1.4 to 3.0.

6. The magnetic recording medium according to claim 1, wherein the average size of the long axis of the magnetic particles in said lower layer of said two layered structure is from about 0.2 to 0.6 micron.

7. The magnetic recording medium according to claim 1, wherein:
$m_2$ is equal to or larger than $m_1$, in which $m_2$ is the thickness of the lower layer and $m_1$ is the thickness of the upper layer.

8. The magnetic recording medium according to claim 7, wherein $m_2/m_1$ is not less than 1.0.

9. The magnetic recording medium according to claim 7, wherein $m_2/m_1$ is from about 1.1 to 4.0.

10. The magnetic recording medium according to claim 7, wherein $m_2$ is within a range of 1.0 to 3.0 microns.

11. The magnetic recording medium according to claim 7, wherein $(m_2+m_1)$ is within a range of 3.5 to 7.0 microns.

* * * * *